United States Patent
Streatch et al.

(10) Patent No.: US 8,976,187 B2
(45) Date of Patent: Mar. 10, 2015

(54) SYSTEM FOR ACCELERATING COMPOSITE GRAPHICS RENDERING

(75) Inventors: Paul Streatch, Richmond (CA); Roger MacLean, Ottawa (CA); Dan Dodge, Nepean (CA)

(73) Assignee: 2236008 Ontario, Inc., Waterloo, Ontario (CA)

( * ) Notice: Subject to any disclaimer, the term of this patent is extended or adjusted under 35 U.S.C. 154(b) by 829 days.

(21) Appl. No.: 12/731,763

(22) Filed: Mar. 25, 2010

(65) Prior Publication Data

US 2010/0253693 A1    Oct. 7, 2010

Related U.S. Application Data

(60) Provisional application No. 61/165,743, filed on Apr. 1, 2009.

(51) Int. Cl.
*G09G 5/39* (2006.01)
*G09G 5/393* (2006.01)
*G09G 5/36* (2006.01)
*G06F 9/44* (2006.01)

(52) U.S. Cl.
CPC .............. *G06F 9/4443* (2013.01); *G09G 5/393* (2013.01)
USPC ........... 345/548; 345/545; 345/629; 345/630; 715/788; 715/799

(58) Field of Classification Search
CPC ..... G09G 2340/10; G09G 5/363; G09G 5/39; G09G 5/393; G06F 2205/062
USPC ........... 345/545–548, 629–630; 715/788–799
See application file for complete search history.

(56) References Cited

U.S. PATENT DOCUMENTS

| | | | |
|---|---|---|---|
| 2002/0008703 A1* | 1/2002 | Merrill et al. | 345/473 |
| 2008/0109737 A1* | 5/2008 | Schaeffer et al. | 715/753 |
| 2008/0284798 A1* | 11/2008 | Weybrew et al. | 345/630 |
| 2010/0058229 A1* | 3/2010 | Mercer | 715/788 |

* cited by examiner

*Primary Examiner* — Xiao M. Wu
*Assistant Examiner* — Matthew D Salvucci
(74) *Attorney, Agent, or Firm* — Brinks Gilson & Lione

(57) ABSTRACT

A system aids composited graphics rendering. A script and corresponding virtual machine engine code may be stored in memory. An off-screen buffer is generated in the memory by the script. The off-screen buffer includes an extended stage having first a buffer portion. The buffer portion may include pre-rendered graphical object. An on-screen buffer may include a composition of the pre-rendered graphical objects of the extended stage. The script renders a graphical change to the on-screen buffer using independent block copying, from the extended stage to corresponding target areas in the on-screen buffer, of one or more of the pre-rendered graphics of the extended stage area affected by the graphical changes.

28 Claims, 7 Drawing Sheets

SYSTEM FOR ACCELERATING COMPOSITE GRAPHICS RENDERING

RELATED APPLICATIONS

This application claims the benefit of the filing date under 35 U.S.C. §119(e) of Provisional U.S. Patent Application Ser. No. 61/165,743, filed Apr. 1, 2009, the entirety of which is incorporated by reference herewith.

BACKGROUND OF THE INVENTION

1. Technical Field

The present invention relates to a system for aiding graphics rendering and, more particularly, to a system for accelerating graphics rendering and compositing in an environment comprising a script language and corresponding engine.

2. Related Art

Devices that display images may be used in many of applications. MP3 players may display images of an artist and/or album artwork associated with its stored media content. Video players may display streaming video from a memory storage device, a private network, and/or the Internet.

Many of these devices provide a user interface to interact with the device. The interface may include a hardwired interface as well as a graphical user interface (GUI). Hardwired interfaces may include pushbutton switches, rotary switches/potentiometers, sliders, and other mechanical based items. Virtual interfaces may be implemented using virtual buttons, virtual sliders, virtual rotator controls, and other display objects. In a combined interface, function identifiers may be generated on a display adjacent to mechanical elements.

The GUI may be implemented using a script application and corresponding virtual machine engine. The virtual machine engine may provide an interface between the script application and the operating system and/or hardware platform of the device. Substantially the same script application or program may be used with different hardware and/or operating system platforms by incorporating a virtual machine engine that may be specific to the hardware and/or operating system of the device.

FLASH® programs may implement GUIs of the foregoing type. The FLASH® environment may include a virtual machine engine, such as a FLASH Player®, that runs a corresponding script application or program. FLASH® may be used to manipulate vector and raster graphics and to support bi-directional streaming of audio and video. The FLASH® environment includes a scripting language called ActionScript®. The FLASH® environment is suitable for use with a wide range of hardware platforms, operating system platforms, and corresponding devices.

Rendering graphics to a display screen using a script application or program and corresponding virtual machine engine may be computationally intensive, particularly when changes to a scene on the display are made in response to a triggering event, such as a user input and/or other event. Scene changes may involve updating the display at frame rates including, but not limited to, thirty frames per second. Each FLASH® frame may be rendered using one or more main processing units.

FLASH® script and virtual machine engines may include multiple objects, some of which are ultimately rendered to a display. Each such object may include other objects and/or graphical primitives, such as rectangles, text, and other primitives. When a change is made to a scene that is presented on the display, affected objects and their graphical primitives may be re-rendered from a back layer to a front-most layer. This repetitive re-rendering of all the affected objects and their graphical primitives may have significant computational costs depending on the size of the affected area, such as the number of pixels that are to be changed. The computational costs may also depend on the number and complexity of the graphic objects within the changed area. In devices having limited processing resources, the rate of the frame updates and/or the processing system operating budget may be exceeded by these re-rendering costs.

SUMMARY

A system accelerates composited graphics rendering. The system includes one or more processors, a memory accessible by the one or more processors, a display screen, and a script application stored in the memory. Virtual machine engine code is stored in the memory and executed by the one or more processors. The virtual engine code is adapted to run the script application. The script application is executed to generate an off-screen buffer in the memory. The off-screen buffer includes an extended stage including a first buffer portion, where the first buffer portion includes one or more pre-rendered graphical objects. An on-screen buffer in the memory includes a composition of the pre-rendered graphical objects of the extended stage. Content of the on-screen buffer is displayed on the display screen. The script application is executed to render a graphical change to the on-screen buffer using independent block copying of one or more of the pre-rendered graphical objects of the extended stage affected by the graphical change from the extended stage to corresponding target areas in the on-screen buffer.

In addition or alternatively, a system includes one or more processors, memory accessible by the one or more processors, and a display screen. A script application and virtual machine engine code may be stored in the memory. The virtual machine engine code may be executable by the one or more processors to run the script application. The script application may generate a stage in an off-screen buffer in the memory. The stage may be extended compared to an on-screen buffer that is used to present images on the display screen. The stage may include at least a first stage area having a background object and a second stage area. The second stage area may include a plurality of graphical objects and be logically adjacent the first stage area. The graphical objects of the stage need only be rendered to the stage. Thereafter, the script application may copy objects affected by one or more object transitions from the stage area directly to corresponding target areas of the on-screen buffer. Transitions of an object may occur when the object is repositioned on the display screen or is otherwise affected by a change in position of one or more other objects on the display screen.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The inventions may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
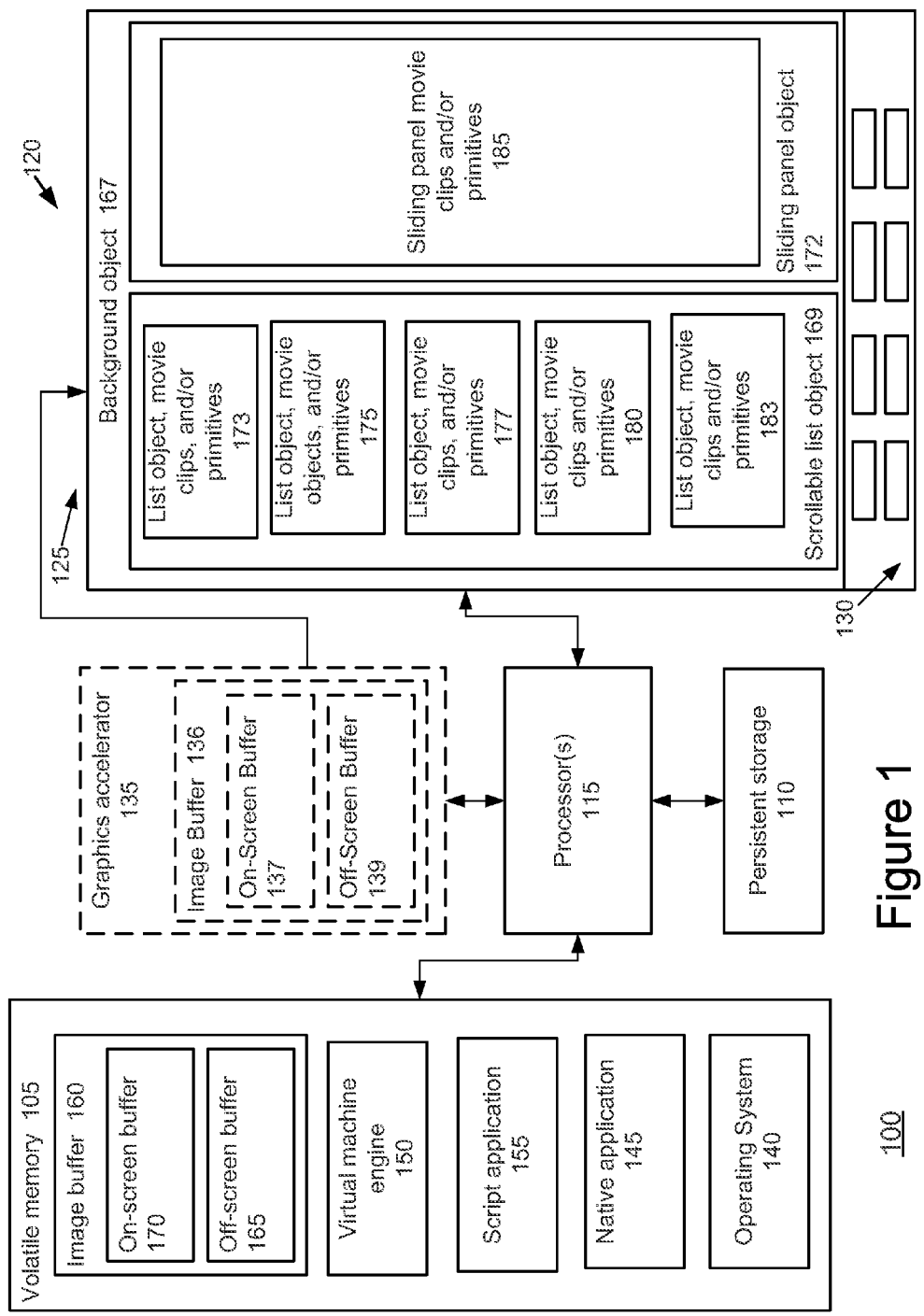
FIG. 1 is a block diagram of a system that accelerates composite graphics rendering.

FIG. 1 is a block diagram of a system 100 that may include accelerated composite graphics rendering for a device. System 100 includes memory 105 and storage 110 that are accessible by one or more processors 115. The memory 105 may be volatile memory and the storage 110 may be persistent storage. The system 100 may assist in displaying images used in applications executed with the device. For example, devices such as MP3 players may display images of an artist and/or album artwork associated with its stored media content. Video players may display streaming video from a memory storage device, a private network, and/or the Internet.

A user interface 120 may be used with the device to present graphics to a user and to facilitate entry of user data and commands. The user interface may include a display screen 125, which may be in the form of a touch screen display or any other screen type. Additionally, or in the alternative, user data and commands may be entered through virtual and/or mechanical buttons, sliders, rotational controls, a mouse, a pointing device, or other data entry and/or command interface components. The interface components may be located at various locations with respect to the display screen 125. System 100 shows some of the entry components located in a region 130 below display screen 125.

Processors 115 may interface with the display screen 125 and/or components of region 130. The processors 115 and the screen 125 may interact with one another through an optional graphics accelerator 135. The graphics accelerator 135 may include an image buffer 136 having an on-screen buffer 137 and/or an off-screen buffer 139. Additionally, or in the alternative, processors 115 may interact with display screen 125 through standard interface components that do not include the graphics accelerator 135.

Volatile memory 105 may include code that is executable by the processors 115. The executable code may include an operating system 140, such as a real-time operating system available from QNX Software Systems of Kanata, Canada. Further, the executable code may include one or more native applications 145 and a virtual machine engine 150. The virtual machine engine 150 may execute one or more script applications 155.

Volatile memory 105 may also include one or more image buffers 160 generated by the script application 155 (as executed by the virtual machine engine 150). The image buffer 160 may include an off-screen buffer 165 and an on-screen buffer 170. The on-screen buffer 170 may include a composition of rendered graphical objects that are displayed on the screen 125. Additionally, or in the alternative, the image buffer 160 may be included in the graphics accelerator 135. In FIG. 1, the image buffer 136 of the graphics accelerator 135 includes on-screen buffer 137 and off-screen buffer 139.

Figure 2:
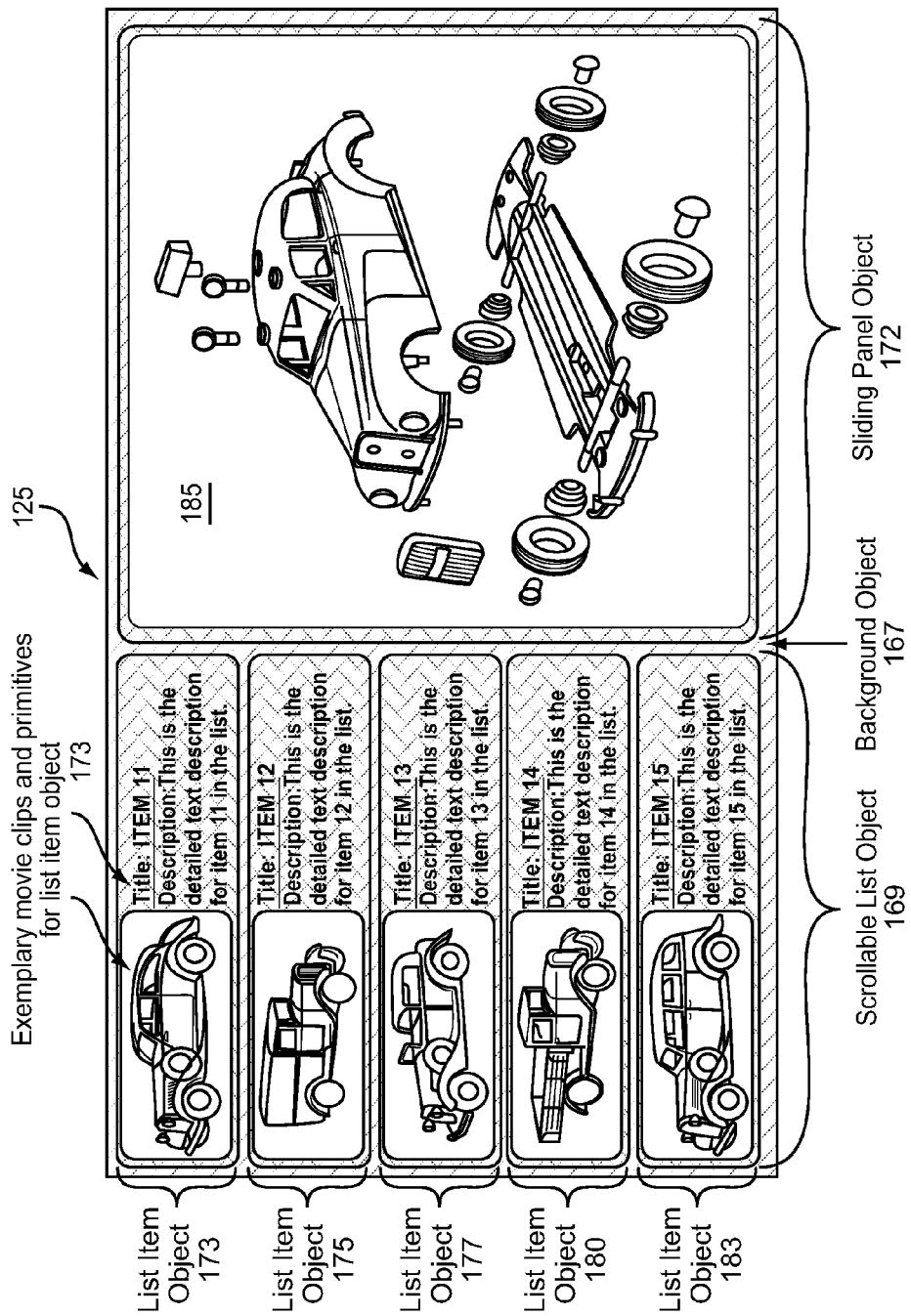
FIG. 2 is a screen that includes a plurality of composited graphical objects.

In FIG. 1 and FIG. 2, Screen 125 includes a plurality of composited graphical objects. The graphical objects include a background object 167, a scrollable list object 169, and a slidable panel object 172. The scrollable list object 169 may include a plurality of individual list objects and associated primitives 173, 175, 177, 180 and 183. Slidable panel object 172 may include slidable panel object movie clips and primitives 185. Specific examples of the objects displayed on screen 125 are in FIG. 2. The exemplary objects of FIG. 2 are used in the subsequent description. Further, although the disclosed apparatus and operations are applicable to other script/virtual machine engine environments, for the sake of explanation examples that follow are described in terms of being implemented in an Adobe FLASH® environment.

Figure 3:
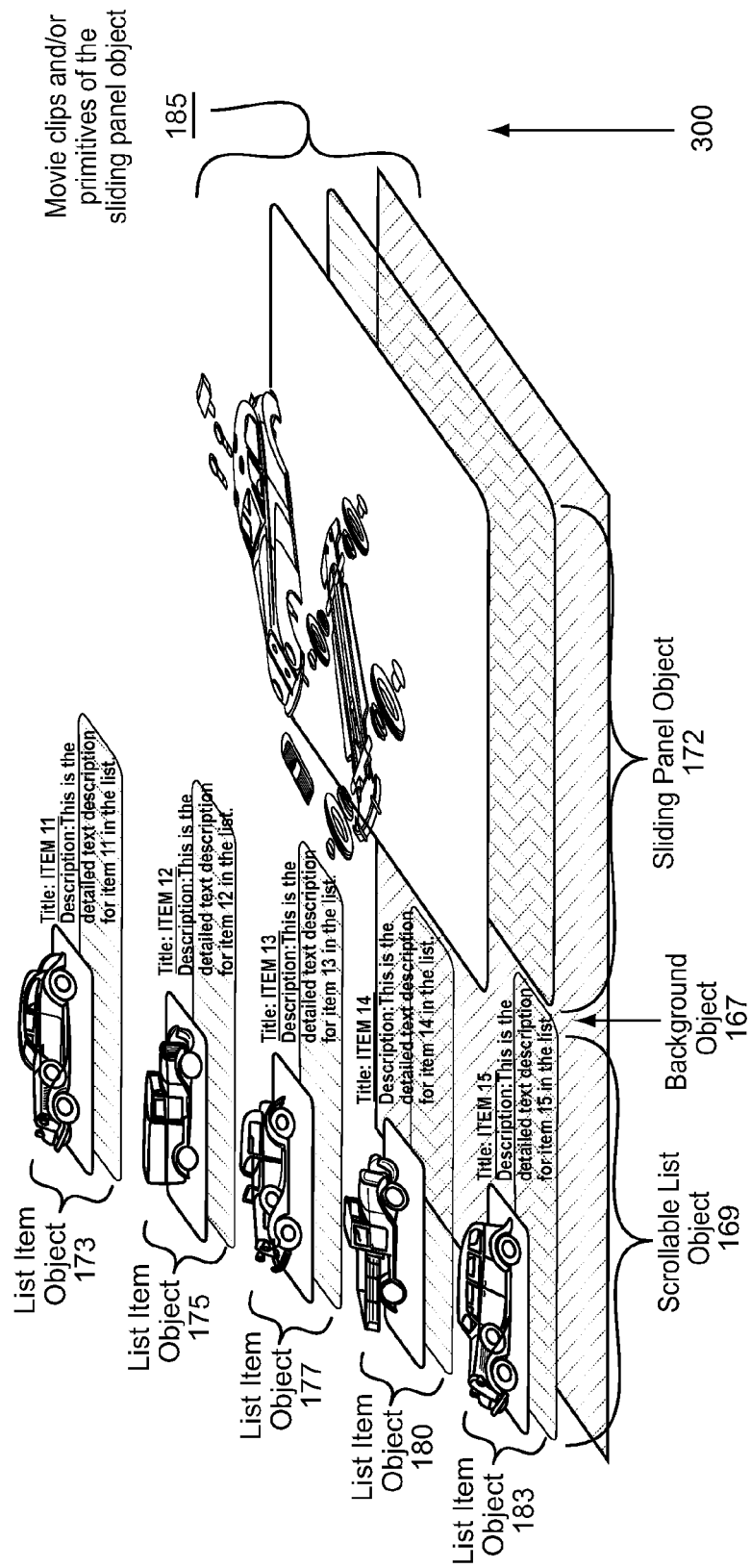
FIG. 3 is a screen of the graphical objects of FIG. 2 rendered to multiple virtual layers.

FIG. 3 shows the objects of FIG. 2 on virtual layers. Each object may be located on its own virtual layer. The primitives of each object may be located on virtual layers over the virtual layers of its corresponding object.

In a script/virtual machine engine environment, such as Adobe FLASH®, the virtual layers are composited and rendered as graphical objects in the order shown by arrow 300. In FIG. 3, the lowermost virtual layer is the background object, where Adobe FLASH® begins the composition and rendering operations. The composition and rendering operations continue until the uppermost virtual layer has been composited and rendered with the graphical objects of the lower virtual layers.

Using the Adobe FLASH® environment during transitions of any of the objects, the objects are processed in this same manner. The objects include objects and all their graphical components in the area affected by the transitions. The transitions include when a graphical object is repositioned on the screen 125 or is otherwise affected by a change in position, addition, or removal of one or more other objects on the screen 125. In the example of FIG. 3, there are at least two visual scenarios in which the screen 125 may be updated: 1) moving the slidable panel object 172 horizontally and/or vertically to a new position on the screen 125; and 2) scrolling through list item objects 173, 175, 177, 180 and 183 of the scrollable list object 169.

To move the slidable panel object 172 to various positions on screen 125, the FLASH® script application may initiate a slide operation in response to a triggering event, such as a user command. The slide operation may reposition the slidable panel object 172 horizontally and/or vertically over a period of time. The motion of the slidable panel object 172 is presented on the screen as a series of frames. For each frame during the movement, the slidable panel object 172 is redrawn in a new position until it reaches its final position.

Scrolling of the scrollable list object 169 through the list item objects 173, 175, 177, 180 and 183 may take place in response to a triggering event, such as a user command entered through the user interface. The FLASH® script application 155 may reposition the list item objects 173, 175, 177, 180 and 183 over a period of time using a sequence of frames presented on the screen 125. For each frame during the scroll operation, the list item objects 173, 175, 177, 180 and 183 are repositioned vertically to their new location. Additionally, new list item objects may appear on the screen as existing visible list item objects go out of view.

In both of these scenarios, execution of the FLASH® script application 155 and corresponding compositing/rendering operations may be computationally intensive. Each modification that occurs in each frame of a transition requires FLASH® applications to re-render complex graphical objects from lower virtual object layers to higher virtual object layers.

Figure 4:
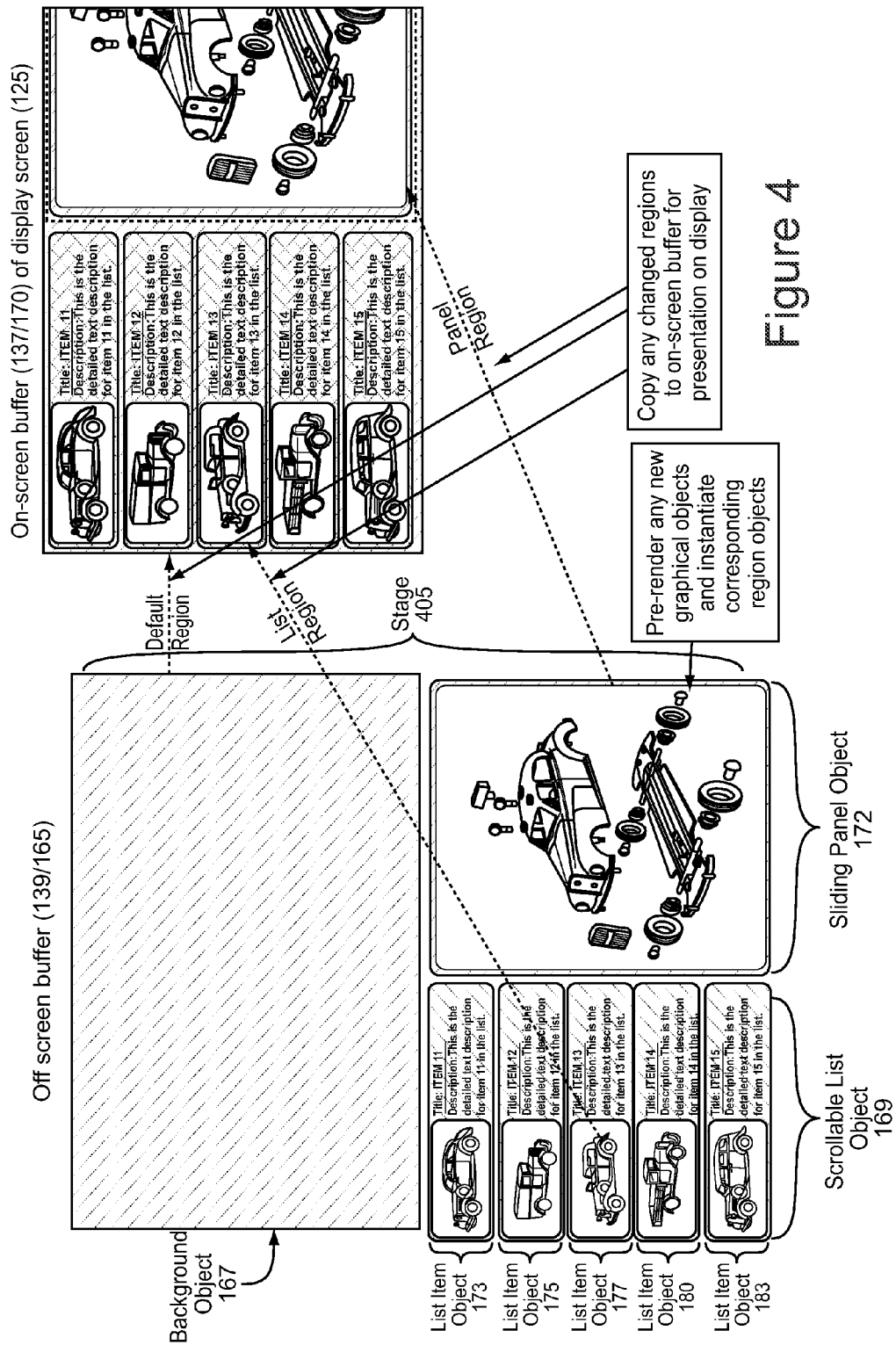
FIG. 4 is a block diagram of how multiple graphical objects may be rendered and composited to a screen in an accelerated manner.
Figure 5:
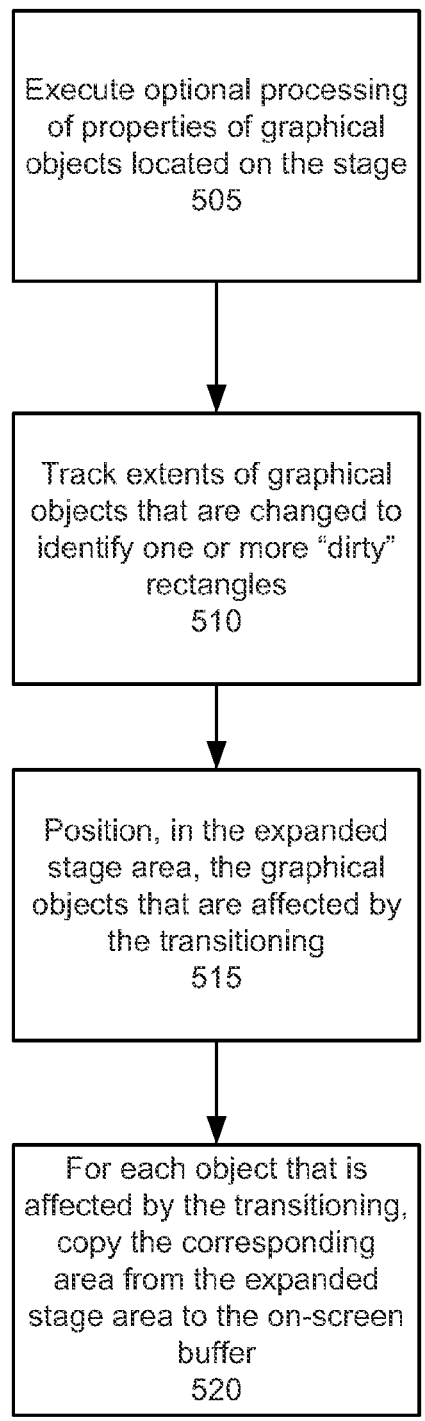
FIG. 5 is a flowchart of a process that may be executed by the system of FIG. 1 using the graphical objects and buffer organization shown in FIG. 4.

FIGS. 4 and 5 illustrate how system 100 may operate to accelerate the compositing and rendering of graphics to screen 125 in a scripting/virtual machine engine environment, such as Adobe FLASH®. In FIGS. 1 and 4, the script application 155 generates a stage 405 in an off-screen buffer. The off-screen buffer (139 and/or 165) may be located in memory 105 and/or graphics accelerator 135. The stage 405 is extended to include an additional rendering area. In FIG. 4, stage 405 may include a first portion, such as having the background object 167, and a second portion. The second portion may include the remaining graphical objects on the screen 125 in FIG. 2 and be logically positioned adjacent to the background object, such as vertically adjacent. Each graphical object of the stage 405 is rendered in a completed state so that no further rendering of the graphical object in the Adobe FLASH® environment is needed when the graphical object is repositioned or otherwise affected by movement, generation, and/or removal of other graphical objects of the screen 125.

In FIGS. 1 and 4, the on-screen buffer (137 and/or 170) may be located in memory 105 and/or graphics accelerator 135. The content of the on-screen buffer is provided for display to a user via screen 125. The on-screen buffer includes a rendered image of the composited graphical objects of the extended stage 405. The graphical images corresponding to the graphical objects of stage 405 are located in the on-screen buffer at logical positions that position the graphical objects at the desired positions on the display screen 125.

FIG. 5 is a process executed by system 100 using the buffer organization and graphical objects shown in FIG. 4. At 505, the script application 155 may execute optional processing of properties of graphical objects located on the stage 405, such as processing with the optional graphics accelerator 135. The extents of graphical objects are tracked at 510. Such extents may include the position of the origin of the graphical object, the height of the graphical object with respect to the origin, and the width of the graphical object with respect to the origin. This tracking may be used to identify one or more "dirty" rectangles (e.g., rectangular areas that have changed as a result of object transitions). The dirty rectangles are used to identify graphical objects that are affected by one or more object transitions. At 515, graphical objects affected by the transition are rendered in the expanded stage 405, where objects need only be rendered once. At 520, each object affected by the transition is copied from the corresponding area of the expanded stage 405 (e.g. the area of the expanded stage 405 having the object that is affected by the transition) to the on-screen buffer 137 and/or 170 for presentation on the display screen 125. In this manner, a substantial number of operations relating to re-rendering and compositing of the graphical objects affected by a transition may be executed outside of the Adobe FLASH® environment. The computational costs of re-rendering and compositing the graphical objects in the Adobe FLASH® environment may thereby be avoided.

Figure 6:
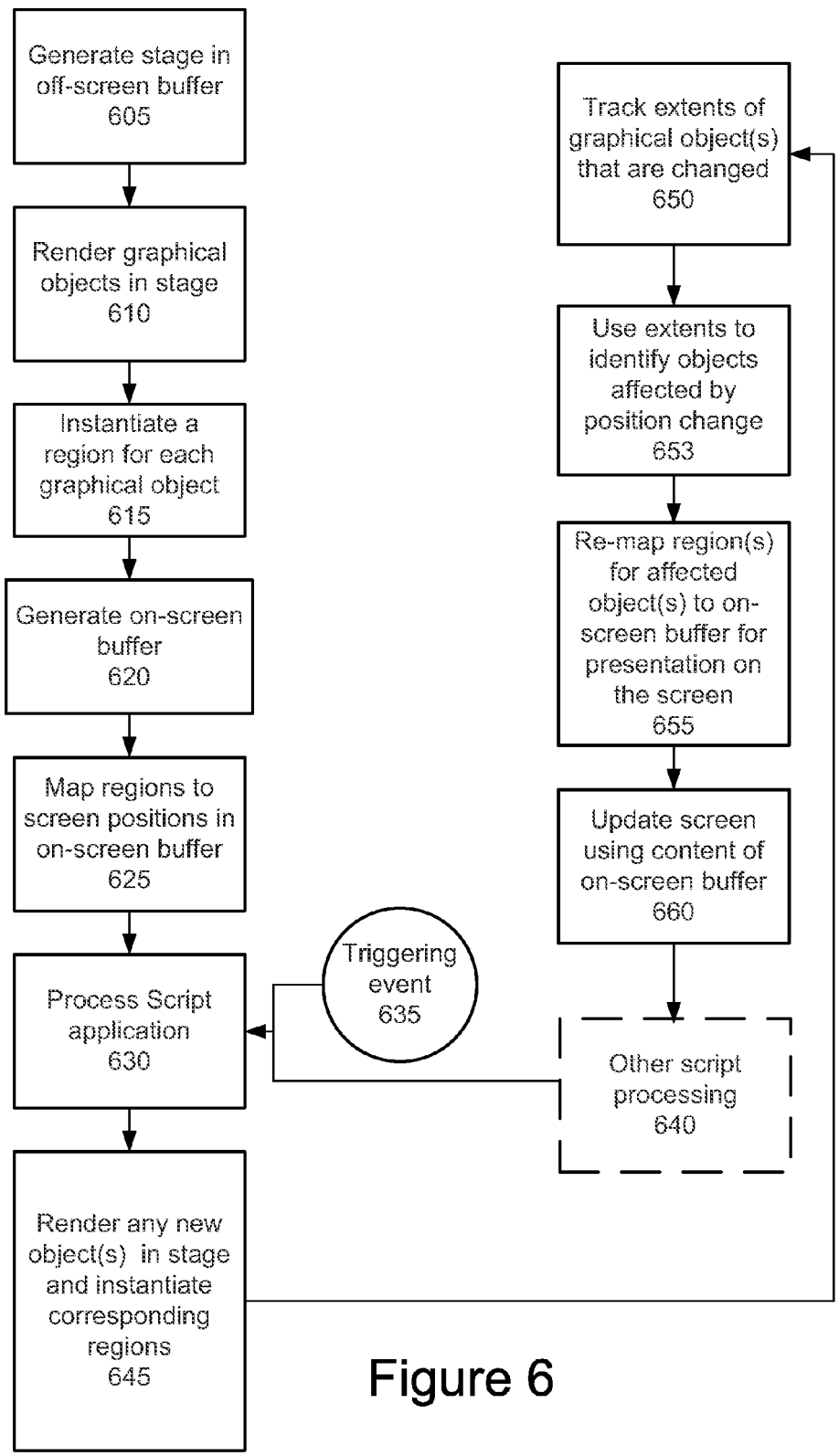
FIG. 6 is a flowchart of a further process that may be executed by the system of FIG. 1 using the graphical objects and buffer organization shown in FIG. 4.

FIG. 6 is a further process that may be executed by system 100 using the buffer organization and graphical objects in FIG. 4. The operations in FIG. 6 are not necessarily executed in the order shown. Rather, the process is subject to various sequences of the exemplary operations.

At 605 of FIG. 6, the script application 155 generates the stage 405 in the off-screen buffer. Graphical objects are rendered to at least the first and second portions of the stage 405 at 610. The graphical objects are rendered in a completed state so that they may only need to be rendered once (provided the graphical objects are displayed on screen 125). Additionally, or in the alternative, determined portions of the graphical objects may be rendered, such as portions that are identified as being affected by graphical transitions. Only the identified portions of the graphical objects, as opposed of the whole graphic object, need to be copied to the on-screen buffer 137. Additionally, or in the alternative, the script application 155 may wait until it determines that a graphical object on screen 125 has been moved. This determination may be made in the Adobe FLASH® environment by checking for "dirty" rectangles. The rendering and instantiating at 610 and 615, respectively, may be limited to graphical objects that intersect one another at such dirty rectangles. When a graphical object is initially rendered to stage 405, the rendering and compositing of the graphical object takes place in the Adobe FLASH® environment.

At 615, the script application 155 uses a region class to instantiate a region object for each graphical object in the stage 405. A region object corresponds to a rectangular area of the stage 405 that may be displayed at various portions of the screen 125. Each region may be defined in relationship to the extents of the corresponding graphical object on the stage 405. In addition, a depth parameter may be assigned to the region object. The depth parameter may be used when the areas of two or more region objects overlap one another. If such overlapping occurs, the graphical object of the region with the greater depth (as measured from the background) may be displayed on the screen 125 over the graphical objects of the other regions. FIG. 4 includes a default region object for the background object 167 of stage 405.

At 620, the on-screen buffer is generated and the graphical object of each region is mapped to a screen position in the on-screen buffer at 625. The relationship between an area on stage 405 and the screen 125 may be established using the following exemplary map method call of the region class:

reg.map(stage_x, stage_y, width, height, screen_x, screen_y, [alpha]);

This call maps a region object on the stage 405 at location stage_x and stage_y to a position screen_x, screen_y on the screen 125. When the region is copied from the stage to the screen, the graphical objects in the region may replace and/or blend with whatever graphical content was previously at that screen location.

In FIG. 6, processing of the script application 155 may continue at 630. When the script application 155 receives a triggering event 635 and/or has completed other script processing at 640, transitions of the graphical objects may be addressed. At 645, the script application 155 determines whether any new graphical objects are to be displayed on screen 125. Each new graphical object may be rendered to stage 405 at 645, and a corresponding region object for each new graphical object may be instantiated. Once the new graphical objects have been addressed at 645, the script application 155 may track the extents of any graphical objects that have been affected by the script processing of 630. At 650 the extents of the region objects corresponding to the graphical objects are tracked. If new graphical objects are unnecessary at 645, the script application 155 may continue its processing by executing tracking operations at 650.

At 653, the extents tracked at 650 may be used to identify the graphical objects that are affected by object transitions. At 655, the map method of the region class may be used to re-map region objects of any graphical objects affected by a position change to a different location of the on-screen buffer and, thus, to a different position on screen 125. Each graphical object of stage 405 need only be rendered once since the pre-rendered object is merely re-mapped from a fixed position of stage 405 to a new location of the on-screen buffer. In FIG. 4, the sliding panel object 172 has been re-mapped so that it appears as though it has been moved to the right-hand side of the screen 125. A plurality of re-mappings of the sliding panel object 172 may be executed as the sliding panel object 172 is moved to its desired position.

Such re-mappings may take place gradually over a number of sequential frames to provide substantially fluid motion of the sliding panel object 172 across the screen 125. The composition of a frame in the on-screen buffer may be achieved by performing independent block copies of the region objects corresponding to the background object, the scrollable list object, and slidable panel object from their corresponding source areas in stage 405 to their corresponding target areas in the on-screen buffer. The independent block copies may include alpha blending, or other ways to represent image partial transparency and/or translucency, if desired. Further, the optional graphics accelerator 135 may be used to improve the graphics rendering and compositing operations of system 100.

Enhanced graphics performance may also be achieved when a graphical object of stage 405 is rendered to the stage 405 more than once. For example, when using graphical objects having a substantial number of virtual layers, a limited number of virtual layers of the total number of virtual layers may be pre-rendered to the stage 405. This may leave rendering of the remaining virtual layers of the graphical object to the FLASH® applications. A computational cost benefit may be realized in such circumstances since the number of virtual layers rendered by the FLASH® application is reduced. In each instance (single rendering of a graphical object and/or rendering of selected virtual layers of a graphical object), portions of the graphical objects of stage 405 may be moved to different portions of the screen 125 without significant rendering of the graphical objects within the Adobe FLASH® environment.

At 660, the graphical objects of the stage 405 are written to the on-screen buffer for presentation on the screen 125. Other optional script processing may take place at 640.

A similar approach to the process of FIG. 6 may transition the list item objects of the scrollable list object 169. In such transitions, individual list item objects may be rendered once to the stage area 405, and copied to the on-screen buffer area as the list object items are scrolled. Inbound list object items that become visible in the list may replace outgoing items that they become invisible.

A mouse, touch screen, and/or other pointing device may be used to various ends in system 100. When a pointing device is used, the position of the graphical objects on screen 125 (as well as its position in the on-screen buffer) do not correlate to the position of the graphical objects in the stage 405. The position of the graphical objects on the screen 125 and the position of the graphical objects in the stage 405 may be correlated with one another by adjusting the coordinates of the pointing device to match the location of the region objects of stage 405.

When variables such as _xmouse and _ymouse are used to determine the position of a pointing device on the screen 125, the script application 155 may use an offset x and an offset y value relative to the origin or other fixed coordinate of the stage 405 to re-map the position of the pointing device to a corresponding position of the stage 405. Using an exemplary information class, the calls:

Info.get('mouse','x'); and
Info.get('mouse','y');

may be used to return the raw coordinates of the pointing device on the screen 125. These raw coordinates may be re-mapped to region objects in the stage 405 by adding the x coordinate returned by the call with the x offset value, and adding the y coordinate returned by the call with the y offset value. The new coordinates may then be compared to the coordinates of the region objects of stage 405 to determine whether the pointing device is proximate any of the region objects and their corresponding graphical objects.

When the pointing device hovers over a portion of the screen 125 that corresponds to a region object, the script application 155 may control the cursor style assigned to the proximate graphical object. Further, the script application 155 may respond to selection events associated with the underlying graphical object located on stage 405 once the position of the pointing device is mapped to the stage 405.

Figure 7:
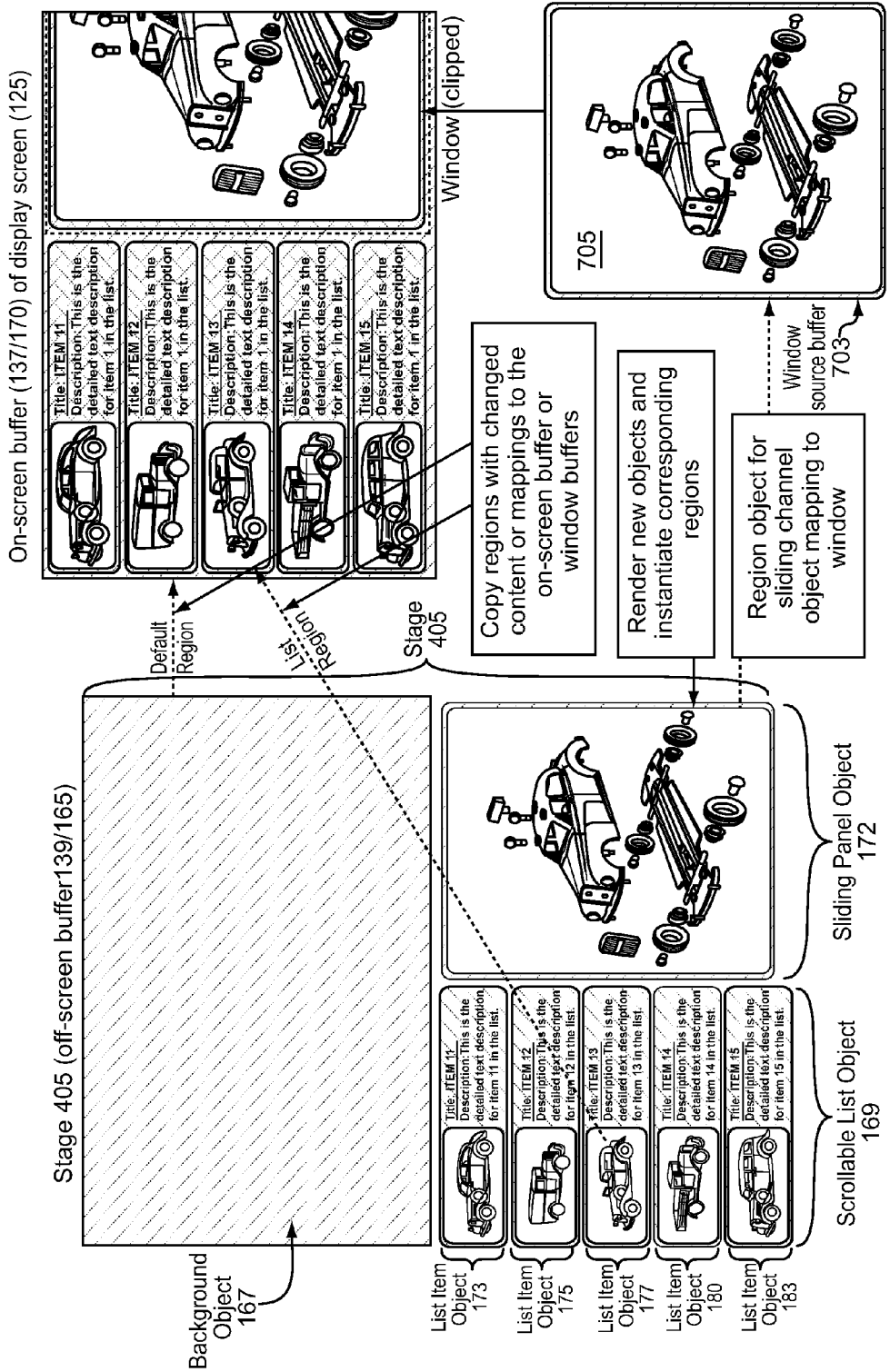
FIG. 7 is a block diagram of another manner of accelerating the compositing and rendering of graphic content in a script/virtual machine engine environment, such as the one shown in FIG. 1.

FIG. 7 shows an additional and/or alternative process of accelerating the compositing and rendering of graphic content in a script/virtual machine engine environment. In FIG. 7, the script application instantiates one or more objects of a "windows" class. A new window object given class, id, dimensions, stage location, and screen coordinates may be instantiated, for example, in the following manner:

Window (String class, String id,
    int stage_x, int stage_y, int width,
    int height, int screen_x, int screen_y)

This constructor creates a new window on the screen. The arguments used to instantiate the new window object may include:
class
    The class name that is associated with the window.
id
    A string representing the ID of the window.
stage_x
    The horizontal stage coordinate.
stage_y
    The vertical stage coordinate.
width
    The width of the window.
height
    The height of the window.
screen_x
    The horizontal position of the window on the screen
screen_y
    The vertical position of the window on the screen.

The instantiation returns an object that represents a window on, for example, a layer of a hardware graphics controller.

The foregoing constructor facilitates creation of window objects. Multiple objects may be instantiated in addition to the main window, which is created automatically. For example, using the following constructor:

w=new Window('Flash2','fish',1000,0,320,240,500, 100);

an empty window (with class Flash2 and id fish) is created in a location exterior to the current screen 125. This is due to the fact that the stage coordinates (1000 and 0), place the new window outside of the viewing area in this example. In FIG. 7, the content of the window 705 is stored in a window source buffer 703. The graphical content of the objects of stage 405 may be copied to the window 705 using the region class. As used herein, copying may also be referred to as mapping, and vice versa. In the following example, a new region object r is created and a map call registers a relationship between new region object the window (or screen):

r=new Region( )
r.map(0,480,320,240,1000,0);

Once the relationship has been established, the graphical content of the region object may be copied to the window whenever some mapping of the region object is changed and/or when a new graphical object is rendered to stage 405 by the script application 155. The copy operation may involve blitting the graphical content of the region object to its mapped location in the window 705, where the graphical content may be composited with other graphical objects to the screen 125 using, for example, hardware sprite processing. Such hardware sprite processing may be implemented by the graphics accelerator 135. Graphics accelerator 135 may be an LCD graphics controller, an advanced 3D graphics accelerator, a 2D graphics accelerator, or any other graphics hardware that executes hardware rendering of multiple graphics layers. The window 705 may be positioned over other visible graphic objects on the screen 125. Windows for the main background and other visible graphical objects may be positioned independently on the screen 125.

Rendering graphical objects from regions of the stage 405 into a separate window may be used to provide functionality that supplements the graphics capabilities of the Adobe FLASH® environment. Normally, all FLASH® output is rendered into a single window. If system 100 includes multiple graphical applications, each with respective windows, the final screen display may be determined by dealing with the separate windows as a stack, where windows higher in the stack may partially obscure or be blended with windows lower in the stack. By dealing with the separate windows in this manner, there is flexibility in how Adobe FLASH® objects may be composited with graphical content of other applications.

In one example, a FLASH® application may provide the background object and user interface controls to the screen 125. A window of a second application displaying video may be displayed on the screen 125 over the background. A dialog box generated by the FLASH® application may be displayed on top of the video window by rendering the dialog box to the stage 405 and mapping the corresponding region to a window at a higher level than the video window.

The methods and descriptions set forth above may be encoded in a signal bearing medium, a computer readable medium or a computer readable storage medium such as a tangible memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, an entertainment system and/or comfort controller of a vehicle, or in non-volatile or volatile memory remote from or resident to the device. The memory may retain an ordered listing of executable instructions for implementing logical functions. A logical function may be implemented through digital circuitry, through source code, through analog circuitry, or through an analog source such as through an audio signal. The software may be embodied in any computer-readable medium or signal-bearing medium, for use by, or in connection with an instruction executable system or apparatus resident to a vehicle or a hands-free or wireless communication system. Alternatively, the software may be embodied in media players (including portable media players) and/or recorders. Such a system may include a computer-based system, a processor-containing system that includes an input and output interface that may communicate with an automotive or wireless communication bus through any hardwired or wireless automotive communication protocol, combinations, or other hardwired or wireless communication protocols to a local or remote destination, server, or cluster.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or a machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:
one or more processors;
memory accessible by the one or more processors;
a display screen;
a script application comprising processor-independent instructions stored in the memory;
virtual machine engine code stored in the memory and executed by the one or more processors, where the virtual machine engine code is adapted to execute the script application and provide an interface between the script application and the one or more processors;
where the script application is executed to generate an off-screen buffer in the memory, the off-screen buffer comprising an extended stage including a first buffer portion and a second buffer portion that includes one or more pre-rendered graphical objects;
an on-screen buffer in the memory, where the on-screen buffer includes a composition of the pre-rendered graphical objects of the extended stage, and where content of the on-screen buffer is displayed on the display screen, where the pre-rendered graphical objects are objects displayed on the screen that are affected by graphical changes, and wherein the on-screen buffer includes a plurality of target areas; and
where the script application is executed to render a graphical change to a first target area among the plurality of target areas of the on-screen buffer using independent block copying of one or more of the pre-rendered graphical objects of the extended stage affected by the graphical change from the extended stage to the first target area of the on-screen buffer.

2. The system of claim 1, where the processor maps the pre-rendered graphical objects to display screen locations in the on-screen buffer.

3. The system of claim 2, where the pre-rendered graphical objects are mapped by region.

4. The system of claim 3, where the pre-rendered graphical objects in the region replace whatever graphical content was previously at that display screen location.

5. The system of claim 1, where the graphical change to the on-screen buffer is rendered by the processor when the script application receives a triggering event.

6. The system of claim 5, where the triggering event comprises a user input.

7. The system of claim 1, where the script application tracks an extent of any graphical objects affected by script processing.

8. The system of claim 1, where the script application copies one or more of the pre-rendered graphical objects to a window.

9. The system of claim 8, where the window is positioned over other visible graphic objects displayed on the display screen.

10. The system of claim 1, where the script application copies only determined portions of the one or more pre-rendered graphical objects.

11. The system of claim 10, where the determined portions of the one or more pre-rendered graphical objects are identified as being affected by graphical transitions.

12. A system comprising:
one or more processors;
memory accessible by the one or more processors;
a display screen;
a script application comprising processor-independent instructions stored in the memory;
virtual machine engine code stored in the memory, the virtual machine engine code executed by the one or more processors to execute the script application and provide an interface between the script application and the one or more processors;
where the script application is executed to generate a stage in an off-screen buffer in the memory, the stage being extended compared to an on-screen buffer that is used to present images on the display screen, the stage including at least a first stage area having a background object and a second stage area;
where the second stage area including a plurality of graphical objects and being logically adjacent the first stage area, the graphical objects of the stage only being rendered to the stage; and
where the script application copies only portions of objects affected by one or more object transitions from the stage area directly to corresponding target areas of the on-screen buffer, where transitions of an object occur when the object is repositioned on the display screen or is otherwise affected by a change in position of one or more other objects on the display screen.

13. The system of claim 12, where the processor maps the graphical objects to display screen locations in the on-screen buffer.

14. The system of claim 13, where the graphical objects are mapped by region.

15. The system of claim 14, where the graphical objects in the region replace whatever graphical content was previously at that display screen location.

16. The system of claim 12, where the object is repositioned on the display screen or is otherwise affected by a change in position upon a user input.

17. The system of claim 12, where the script application tracks an extent of any graphical objects affected by script processing.

18. A method comprising:
generating with a processor an off-screen buffer, the off-screen buffer being stored in a memory accessible by the processor, the off-screen buffer comprising an extended stage including a first buffer portion and a second buffer portion including one or more pre-rendered graphical objects;
generating an on-screen buffer including a plurality of target areas, the on-screen buffer being stored in the memory, where the on-screen buffer includes a composition of the pre-rendered graphical objects of the extended stage, where the pre-rendered graphical objects are objects displayed on the screen that are affected by graphical changes;
executing a script application comprising processor-independent instructions to render a graphical change to a first target area among the plurality of target areas of the on-screen buffer using independent block copying one or more of the pre-rendered graphical objects of the extended stage affected by the graphical change from the extended stage to the first target area of the on-screen buffer, wherein the script application is executed using a virtual machine engine code stored in the memory to provide an interface between the script application and the processor; and
displaying the on-screen buffer on a display screen.

19. The method of claim 18, further comprising mapping the pre-rendered graphical objects to display screen locations in the on-screen buffer.

20. The method of claim 19, where the pre-rendered graphical objects are mapped by region.

21. The method of claim 20, where the pre-rendered graphical objects in the region replace whatever graphical content was previously at that display screen location.

22. The method of claim 18, further comprising rendering the graphical change to the on-screen buffer when the script application receives a triggering event.

23. The method of claim 22, where the triggering event comprises a user input.

24. The method of claim 18, further comprising tracking an extent of any graphical objects affected by the script execution.

25. The method of claim 18, where the script application copies one or more of the pre-rendered graphical objects to a window.

26. The method of claim 25, where the window is positioned over other visible graphic objects displayed on the display screen.

27. The method of claim 18, where the script application copies only determined portions of the one or more pre-rendered graphical objects.

28. The method of claim 27, where the determined portions of the one or more pre-rendered graphical objects are identified as being affected by graphical transitions.

* * * * *